(12) United States Patent
Mangelsen et al.

(10) Patent No.: US 6,317,994 B1
(45) Date of Patent: Nov. 20, 2001

(54) ROBOT ALIGNMENT APPARATUS AND METHOD FOR USING SAME

(75) Inventors: Jan C. Mangelsen, Charlotte, IA (US); David N. Bermann, Evans, GA (US)

(73) Assignee: Genesis Systems Group, Ltd., Davenport, IA (US)

( * ) Notice: Subject to any disclaimer, the term of this patent is extended or adjusted under 35 U.S.C. 154(b) by 0 days.

(21) Appl. No.: 09/519,046

(22) Filed: Mar. 3, 2000

(51) Int. Cl.[7] .................................................. G01B 5/25
(52) U.S. Cl. .................................................. 33/502; 73/1.79
(58) Field of Search .............................. 33/502, 533, 613, 33/638, 642, 644, 645, 671, 1.01, 1.75, 1.79

(56) References Cited

U.S. PATENT DOCUMENTS

| 4,372,721 | * | 2/1983 | Harjar et al. ........................... 73/1.79 |
| 5,031,304 | * | 7/1991 | Shepard et al. .......................... 33/644 |
| 5,214,857 | * | 6/1993 | McMurtry et al. ...................... 33/502 |
| 5,309,646 | * | 5/1994 | Randolph, Jr. et al. ............... 33/645 |
| 5,714,674 | * | 2/1998 | Tsukuda et al. ........................ 33/502 |
| 6,241,507 | * | 6/2001 | Kuo ........................................ 33/613 |

* cited by examiner

Primary Examiner—Christopher W. Fulton
(74) Attorney, Agent, or Firm—Zarley, McKee, Thomte, Voorhees & Sease (57) ABSTRACT

A robot aligning apparatus includes a pointer which may be connected to either the robot or the tool carried by the robot. The apparatus also includes a stationary post having a sleeve mounted thereon. The robot or the tool with the pointer mounted thereon are moved to a test station adjacent the sleeve and post, and the sleeve is moved upwardly over the pointer to indicate proper alignment.

19 Claims, 6 Drawing Sheets

ROBOT ALIGNMENT APPARATUS AND METHOD FOR USING SAME

BACKGROUND OF THE INVENTION

This invention relates to a robot alignment apparatus and method for using same.

During the use of robotic equipment, occasionally the equipment becomes misaligned. The misalignment may occur because of a programming error or it may occur because of an unplanned collision of the robotic equipment with the work piece.

In such situations it is necessary to check the alignment of the robot and the alignment of the tool that is mounted to the robot. Previous alignment tools included such things as dial indicators, sharp pointer levels, and scribe marks on the tools. Typically such methods required expensive tools and complicated procedures to check the alignment of both the robot and the tool with respect to the position of the work piece.

It is necessary to check both the alignment of the tool and the alignment of the robot because these two objects can be misaligned individually. For example, a collision might cause misalignment of the tool even though the robot remains in its originally programmed aligned position. Alternatively the tool may be properly aligned, but the program for the robot may cause it to be misaligned. Checking both of these alignments enables the operator to properly align the robot and the tool for use in operating on the work piece.

Therefore a primary object of the present invention is the provision of an improved robot alignment apparatus and method for using same.

A further object of the present invention is the provision of an improved robot alignment apparatus which can be used for checking both the alignment of the robot and the alignment of the tool held by the robot.

A further objective is the provisions of a robot alignment apparatus and method which utilize the same alignment equipment for aligning both the robot and the tool being carried by the robot.

A further object of the present invention is the provision of a robot alignment apparatus which can be quickly and easily mounted on the robot or on the tool for use in aligning the tool and the robot.

A further object of the present invention is the provision of an improved robot alignment apparatus which is simple in construction, economical in manufacture, and easy to use.

SUMMARY OF THE INVENTION

The foregoing objects may be achieved by a robot alignment apparatus having a stationary alignment tool mounted in a predetermined stationary position at an alignment station. The alignment tool comprises a fixed member and a movable member. The movable member is mounted for movement relative to the fixed member along a straight-line alignment axis from a first position to a second position.

The robot includes a robot member, and the robot is programmed to move the robot member to an alignment position adjacent the alignment station. An alignment pointer is detachably connected to the robot member for movement with the robot member to the alignment station.

The movable member maintains a fixed clearance distance from the alignment pointer during movement of the movable member from its first position to its second position to indicate desirable alignment of the robot in the alignment position.

The movable member moves a variable distance from the alignment pointer during movement of the movable member from its first to second positions to indicate an undesirable alignment of the robot in the alignment position.

According to one feature of the invention the robot alignment apparatus includes an elongated bore and the pointer protrudes within the elongated bore when the movable member is in its second position.

According to another feature of the invention the pointer includes a longitudinal axis and a side surface surrounding and facing away from the longitudinal axis. The fixed clearance distance comprises the distance between the side surfaces of the pointer and the bore walls of the bore.

According to a further feature of the invention the side surface of the pointer includes first and second flanges spaced apart from one another along the longitudinal axis of the pointer. The first and second flanges have outer flanges surfaces which conform in shape to the cross sectional shape of the bore.

According to another feature of the invention the first and second flanges remain at a fixed distance from the side walls of the bore during movement of the movable member from its first position to its second position to indicate proper alignment of the robot in the alignment position.

According to another feature of the invention the first and second flanges will move to variable distances from the side wall of the bore during movement of the movable member from its first to its second position to indicate improper alignment of the robot when in its alignment position.

According to another feature of the invention the bore is circular in cross section and the first and second flanges are circular in cross section.

According to a further feature of the present invention the robot member comprises a part of the robot.

According to another feature of the invention the robot member comprises a tool attached to the robot.

The method of the present invention comprises attaching a pointer to the movable robot member on a robot. The next step comprises moving the robot member and the pointer to a test position adjacent the test station. The method next comprises moving a movable alignment tool positioned at the test station along a straight line axis from a first position to a second position whereby the distance between the movable alignment tool and the pointer remains constant throughout movement of the alignment tool between its first and second positions whenever the robot is properly aligned, and varies whenever the robot is improperly aligned.

According to another feature of the method of the present invention the pointer axis and the straight line axis extend in the same direction whenever the pointer is in its test position and the robot is properly aligned, and they extend at angles with respect to one another whenever the robot is improperly aligned.

According to another feature of the method of the present invention the pointer axis and the straight-line axis are colinear when the robot is properly aligned.

According to another feature of the method of the present invention the alignment tool includes a tool bore and the method further comprises moving the movable tool into surrounding relation with respect to the pointer whereby the pointer is within the bore when the movable tool is in its second position.

DETAILED DESCRIPTION OF THE PREFERRED EMBODIMENT

Figure 1:
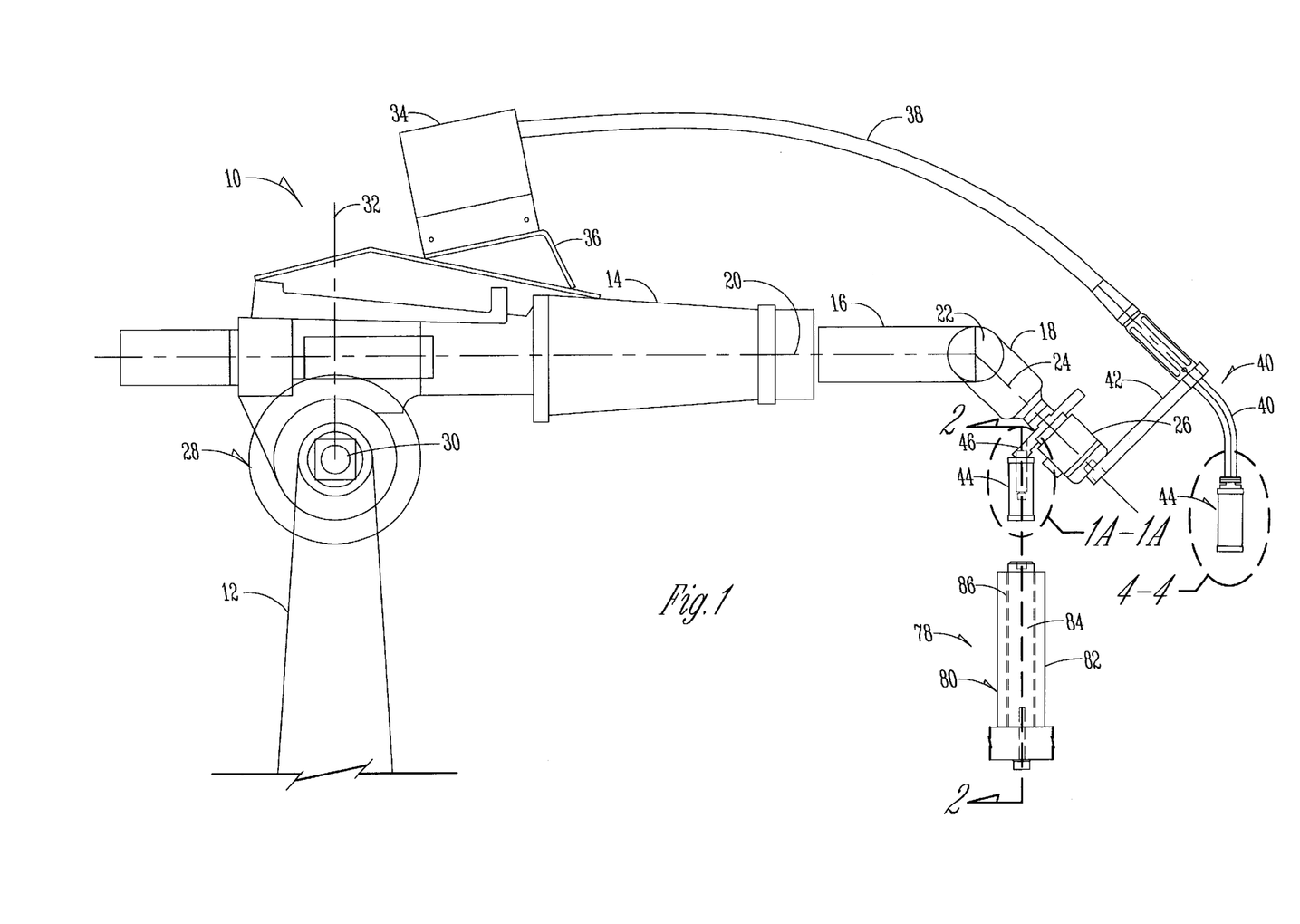
FIG. 1 is an elevational view of a typical robot having a welding torch mounted thereon and showing the pointer of the present invention mounted on both the robot and the torch.

Referring to FIG. 1, the numeral 10 generally designates a typical robot. Robot 10 includes a support mast 12, an upper arm 14, a middle arm member 16, and a lower arm member 18. Upper arm member 14 and middle arm member 16 are pivotally mounted for pivotal movement about an upper pivot axis 20. Middle arm member 16 and lower arm member 18 are pivotally mounted about an elbow axis 22. Lower arm member 18 is pivotally mounted to an adapter plate 46 for pivotal movement about a wrist pivot axis 24. Mounted to the adapter plate 46 is a collision sensor 26 which is adapted to sense when the robot collides improperly with a foreign object. The collision sensor then disables the robot so that proper alignment can be recalibrated.

Upper arm 14 and support mast 12 are joined at a shoulder joint 28 which has the capability of pivoting about a horizontal axis 30 and a vertical axis 32.

Mounted on the robot 10 is a welding torch console 34 which is held in place by a bracket 36. Extending from console 34 is a hose 38 having a welding torch 40 on its outer end. Welding torch 40 is attached to the collision sensor 26 by means of a torch bracket 42.

Mounted on the end of torch 40 is an alignment pointer 44. In order to mount the alignment pointer 44 on the torch 40 it is first necessary to remove the nozzle (not shown) and the contact tip (not shown) from the end of the torch 40.

A similar pointer 44 is also mounted on the adapter plate 46. In FIG. 1 for illustrative purposes the pointer 44 is shown mounted both to the adapter plate 46 and the nozzle 40. However, in normal application it is necessary only to use one pointer 44 and to separately mount that pointer 44 on the adapter plate 46 or the torch 40.

Figure 1A:
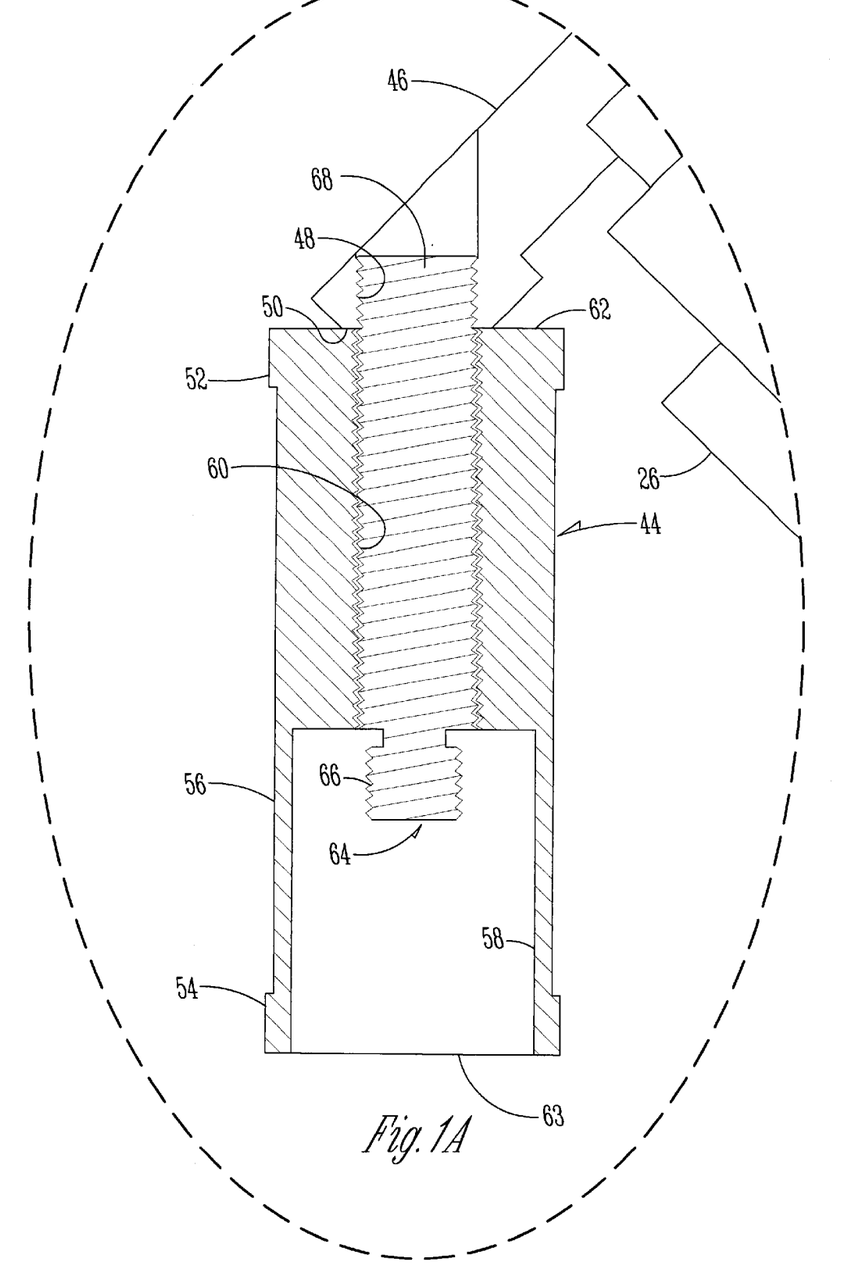
FIG. 1A is an enlarged sectional view taken along line 1A—1A of FIG. 1.

Referring to FIG. 1A, adapter plate 46 includes a threaded bore 48 which extends into a beveled edge 50 as shown in FIG. 1A.

The pointer 44 has a circular cylindrical shape, but the cross sectional shape of the pointer 44 could be square or of almost any configuration without detracting from the invention. The pointer 44 includes an upper pointer flange 52, a lower pointer flange 54 and a reduced central diameter surface 56.

As seen in FIG. 1A, the bottom of pointer 44 is provided with a large counter bore 58 and the upper portion of the pointer 44 is provided with a smaller threaded bore 60. The pointer 44 includes a flat upper surface 62 and a similar flat end 63 at the opposite end.

A threaded stud 64 includes a small threaded end 66 and a larger threaded shank 68. Stud 64 is threaded upwardly into threaded bore 60 and also is threaded within the threaded bore 48 of adapter plate 46. This causes the upper flat surface 62 to abut against the beveled edge 50 of adapter plate 46 and securely holds the pointer 44 in rigid connection to the adapter plate 46.

Figure 2:
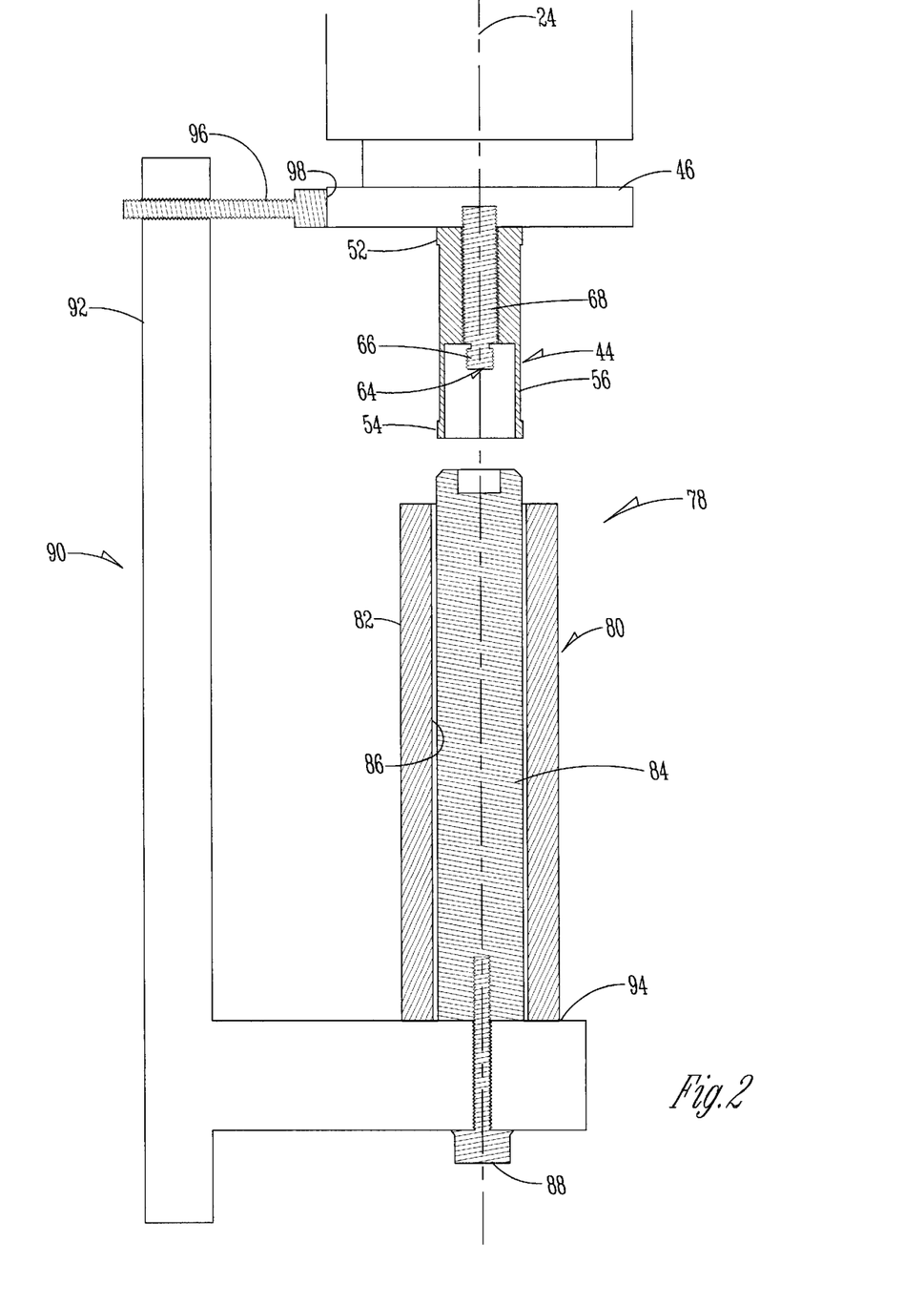
FIG. 2 is a sectional view taken along line 2—2 of FIG. 1.
Figure 3:
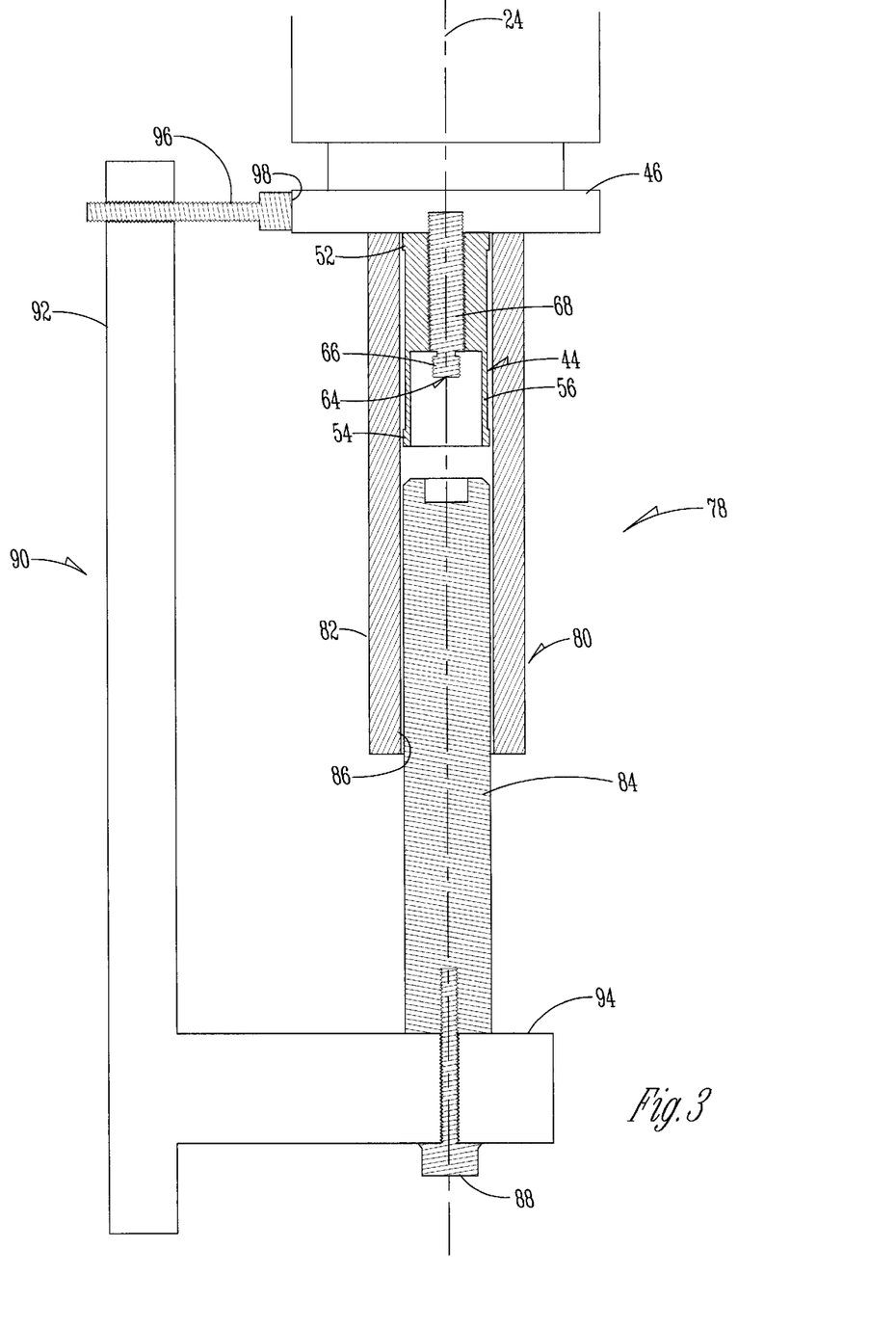
FIG. 3 is a view similar to FIG. 2, but showing the alignment sleeve in its upper position.

FIGS. 2 and 3 illustrate the manner in which the robot is aligned. The robot is programmed to move to a test station designated generally by the numeral 78 as shown in FIG. 2. At the test station 78 is an alignment tool 80 which comprises a sleeve 82 and a post 84. The sleeve 82 includes a sleeve bore 86, and is mounted over the post 84 so that it can slide vertically from the position shown in FIG. 2 to the position shown in FIG. 3. The inner diameter of sleeve bore 86 conforms to the shapes and sizes of flanges 52, 54 on pointer 44, but is slightly larger so as to permit the sleeve to slide with close tolerance over the flanges 52, 54 as shown in FIG. 3. In the preferred embodiment the pointer 44 is circular in cross section, but as previously explained, the cross sectional configuration could be changed without detracting from the invention. However, the cross sectional configuration of the flanges 52, 54 should be the same as the cross sectional configuration of the sleeve 80 so that there is a close tolerance between the flanges 52, 54 and the inner walls of bore 86.

If the robot is properly aligned the sleeve 82 will slide easily upwardly over both of the flanges 54, 52. However, if it slides only over flanges 54 but will not slide over flanges 52 that is an indication that the robot is misaligned and it will need to be reprogrammed. The advantage of using spaced apart flanges 52, 54 is that misalignment can be more easily discerned. If the pointer 44 were of uniform cross section along its entire length, the sleeve would bind during misalignment and it would not be as easy to determine whether or not or how much the alignment is off. However, with the spaced apart flanges 52, 54 the sleeve easily slips over the lower flanges 52, but is only properly aligned if it will slip over the upper flanges 52.

Post 84 is mounted by means of a bolt 88 to an L-shaped frame 90 having an upstanding leg 92 and a lower horizontal leg 94. The L-shaped frame 90 is mounted in a stationary position at test station 78. The test station 78 may be chosen at any location within the reach of robot 10, and the robot 10 is programmed to move to the test station for testing for proper alignment. At the upper end of upstanding leg 92 is a positioning bolt 96 which is adapted to fit against a flat edge 98 of adapter plate 46. This is important so as to insure that the adapter plate 46 is rotated to the proper rotational position about wrist pivot axis 24. If the adapter plate 46 is not rotated to the proper position the pointer will misalign with the sleeve 80. Bolt 96 provides a means whereby the flat edge of adapter plate 46 can abut against the bolt 96 to assure proper positioning.

Figure 4:
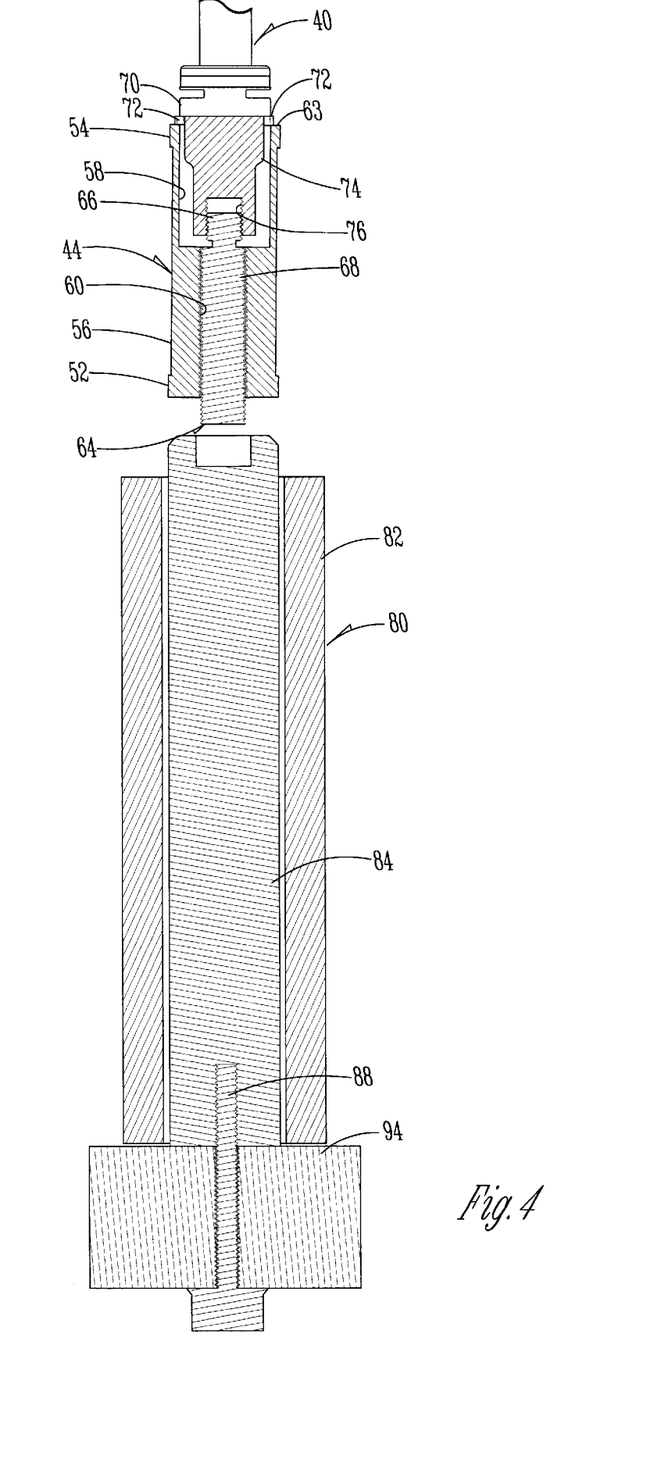
FIG. 4 is an enlarged sectional view taken along line 4—4 of FIG. 1.
Figure 5:
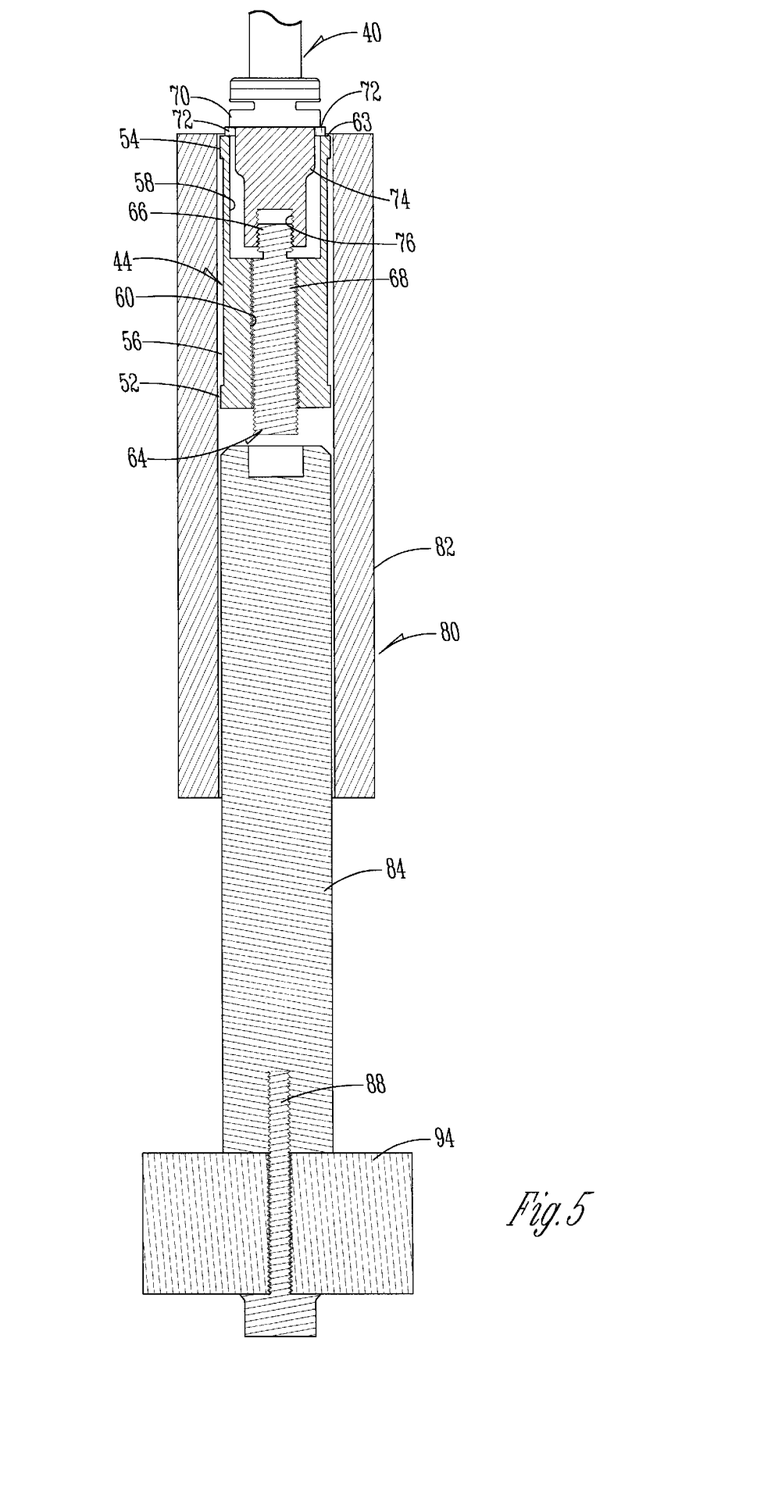
FIG. 5 is a view similar to FIG. 4, but showing the alignment sleeve in its upper position.

The pointer 44 and the alignment tool 80 may also be used to align the torch 40. FIGS. 4 and 5 illustrate the use of the pointer 44 on the end of the torch 40. The pointer 44 is inverted from its position shown in FIG. 2 so that the counter bore 58 is presented upwardly and so that the flanges 54 are at the upper end of the pointer 44. The pointer 44 is then slipped over a receptacle body 74 having a threaded bore 76 at its lower end. Receptacle body 74 is attached to the torch 40 which includes a torch end flange 70 and a spacer ring 72 at its lower end. The threaded bore 76 normally receives the contact tip used with the torch 40. However, before mounting the pointer 44 on the torch 40 the contact tip (now shown) is unthreaded and removed from threaded bore 76.

As can be seen in FIG. 4, the small threaded end 66 of threaded stud 64 is threaded within the threaded bore 76 until the flat end 63 abuts against the spacer 72 and the torch and the flange 70. This fixes the pointer 44 in proper alignment with the torch 40.

The robot is then moved to a position wherein the torch 40 is in alignment with the alignment tool 80 at test station 78. At this point the sleeve 82 is moved upwardly as shown in FIG. 5 to determine whether or not there is proper alignment. If the sleeve does not slip easily over both flanges 52 and 54 there is improper alignment. If the sleeve does slip over flanges 52 and 54 there is proper alignment.

However, in contrast with the alignment of the robot, a certain tolerance for misalignment is permissible for the torch 40. For example, if the sleeve slips over the lower flange 52 but will not slip over the upper flange 54, there is still adequate alignment for the torch 40. But when aligning the robot 10, the sleeve must slip over both flanges 52, 54 for there to be proper alignment.

The pointer 44 and the alignment tool 80 provide a simple and quick way to test both the robot and the tool on the robot for proper alignment. The devices are simple and accurate in their ability to test the proper alignment.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A robot aligning apparatus comprising:
   a stationary alignment tool mounted in a predetermined stationary position at an alignment station;
   said alignment tool comprising a fixed member and a movable member, said movable member being movably mounted to said fixed member for movement relative thereto along a straight line alignment axis from a first position to a second position;
   a robot having a robot member, said robot being programmed to move said robot member to an alignment position adjacent said alignment station;
   an alignment pointer detachably connected to said robot member for movement with said robot member to said alignment station;
   said movable member maintaining a fixed clearance distance from said alignment pointer during movement of said movable member from said first to said second position to indicate desirable alignment of said robot in said alignment position;
   said movable member moving a variable distance from said alignment pointer during movement of said movable member from said first to said second positions to indicate undesirable alignment of said robot in said alignment position.

2. A robot alignment apparatus according to claim 1 wherein said movable member includes an elongated bore having bore walls, said pointer protruding within said elongated bore when said movable member is in said second position.

3. A robot alignment apparatus according to claim 2 wherein said pointer includes a longitudinal axis and a side surface surrounding and facing away from said longitudinal axis, said fixed clearance distance comprising the distance between said side surface of said pointer and said bore walls of said bore.

4. A robot alignment apparatus according to claim 3 wherein said side surface includes first and second flanges spaced apart from one another along said longitudinal axis of said pointer, said first and second flanges having outer flange surfaces which conform in shape to the cross sectional shape of said bore.

5. A robot alignment apparatus according to claim 4 wherein said first and second flanges remain at said fixed distance from said side walls of said bore during movement of said movable member from said first to said second position to indicate proper alignment of said robot when in said alignment position.

6. A robot alignment apparatus according to claim 5 wherein said first and second flanges move to variable distances from said side walls of said bore during movement of said movable member from said first to said second position to indicate improper alignment of said robot when in said alignment position.

7. A robot alignment apparatus according to claim 6 wherein said bore has a circular cross section and said first and second flanges are circular in cross section taken transverse to said longitudinal axis of said pointer.

8. A robot alignment apparatus according to claim 1 wherein said robot member comprises a part of said robot.

9. A robot alignment apparatus according to claim 1 wherein said robot member comprises a tool attached to said robot.

10. A robot alignment apparatus for use with a robot having a robot member movable to a test position adjacent a test station to test for proper or improper alignment of said robot, said apparatus comprising:
    an elongated pointer having a longitudinal pointer axis and being adapted for attachment to said robot member for movement to said test position;
    an alignment tool mounted at said test station, said alignment tool comprising a movable tool member mounted for movement along a straight line axis from an inoperative position to an operative position;
    said longitudinal pointer axis and said straight line axis extending in the same direction to indicate proper alignment of said robot when said robot is in said test position;
    said longitudinal pointer axis and said straight line axis extending at an angle with respect to one another to indicate improper alignment of said robot when said robot is in said test position.

11. A robot alignment apparatus according to claim 10 wherein said movable tool member includes an elongated tool bore extending along said straight line axis, said pointer being within said tool bore when said movable tool member moves to said operative position and said pointer is in said test position.

12. A robot alignment apparatus according to claim 11 wherein said straight line axis and said pointer axis are in registered alignment with one another when said robot is in said test position to indicate proper alignment of said robot.

13. A robot alignment apparatus according to claim 12 wherein said movable tool member comprises a sleeve and said tool bore has a cross sectional shape the same as, and larger than, the cross sectional shape of said pointer.

14. A robot alignment apparatus according to claim 10 wherein said robot member comprises a part of said robot.

15. A robot alignment apparatus according to claim 10 wherein said robot member comprises a tool attached to said robot.

16. A method for testing the proper alignment of a robot having a movable robot member, comprising:
    attaching a pointer having a longitudinal pointer axis to said movable robot member;
    moving said robot member and said pointer to a test position adjacent a test station;
    moving a movable alignment tool positioned at said test station along a straight line axis from a first position to a second position, whereby the distance between said movable alignment tool and said pointer remains constant throughout movement of said alignment tool between said first and second positions whenever said robot is properly aligned and varies whenever said robot is improperly aligned.

17. A method according to claim 16 wherein said pointer axis and said straight line axis extend in the same direction whenever said pointer is in said test position and said robot is properly aligned and extend at angles with respect to one another whenever said robot is improperly aligned.

18. A method according to claim 17 wherein said pointer axis and said straight-line axis are colinear when said robot is properly aligned.

19. A method according to claim 18 wherein said alignment tool includes a tool bore, said method further comprising moving said movable tool into surrounding relation with respect to said pointer whereby said pointer is within said bore when said movable tool is in said second position.

* * * * *

UNITED STATES PATENT AND TRADEMARK OFFICE
CERTIFICATE OF CORRECTION

PATENT NO. : 6,317,994 B1
DATED : November 20, 2001
INVENTOR(S) : Jan C. Mangelsen and David N. Bermann It is certified that error appears in the above-identified patent and that said Letters Patent is hereby corrected as shown below:

<u>Title page,</u>
Under Inventors, please replace "Bermann" with -- Bergmann --.

Signed and Sealed this

Twenty-first Day of May, 2002

Attest:

Attesting Officer

JAMES E. ROGAN
*Director of the United States Patent and Trademark Office*